United States Patent [19]
Rüeter et al.

[11] 4,129,551
[45] Dec. 12, 1978

[54] FLAME RETARDANT POLYESTERS

[75] Inventors: Jöern Rüeter; Raban Grundamann, both of Marl, Germany

[73] Assignee: Chemische Werke Huels Aktiengesellschaft, Marl, Germany

[21] Appl. No.: 730,954

[22] Filed: Oct. 8, 1976

[30] Foreign Application Priority Data

Oct. 23, 1975 [DE] Fed. Rep. of Germany ....... 2547498

[51] Int. Cl.$^2$ ............................ C08K 5/53; C08K 5/03
[52] U.S. Cl. ............................ 260/45.7 R; 260/45.7 P; 260/45.7 PH
[58] Field of Search .................. 260/45.7 RL, 2.5 FP, 260/45.7 P, 650 R

[56] References Cited

U.S. PATENT DOCUMENTS

| | | | |
|---|---|---|---|
| 3,160,653 | 12/1964 | Benning et al. | 260/650 R |
| 3,547,878 | 12/1970 | Savides | 260/45.7 P |
| 3,629,365 | 12/1971 | Gardner | 260/45.7 P |
| 3,658,634 | 4/1972 | Yanagi et al. | 260/45.95 G |
| 3,717,685 | 12/1973 | Hay et al. | 260/650 R |
| 3,850,882 | 11/1974 | Underwood et al. | 260/45.7 RL |

*Primary Examiner*—V. P. Hoke
*Attorney, Agent, or Firm*—Millen & White

[57] ABSTRACT

Nonflammable molding compositions consisting of:
1. a thermoplastic, saturated linear polyester;
2. a triarylphosphine oxide or an aryl or alkyl ester of an arylphosphinic acid;
3. a nuclear-brominated alkylbenzene;
4. customary auxiliary agents and additives; and containing, based on (1) through (4), 0.5 – 10% by weight of bromine and 0.1 – 2% by weight of phosphorus.

10 Claims, No Drawings

FLAME RETARDANT POLYESTERS

BACKGROUND OF THE INVENTION

Linear polyesters, for example, polyethylene terephthalate or polybutylene terephthalate, are being utilized to an increasing extent not only for the production of fibers but also for the manufacture of sheets and molded articles. A fundamental disadvantage of these polyesters is that they support combustion, especially in the molten condition. Therefore, for many practical applications, it is necessary to render these polymers nonflammable.

Three basic methods are known for imparting flame resistance to linear polyesters:

(1) treatment of the surface with appropriate compounds;

(2) incorporation of flame-resistant functions into the polyester chain by condensation, or (3) physical incorporation of flame retardants into the polyester by mixing.

The first two possibilities are of little advantage, for the reasons that the treating agent is retained on the final product for only a limited time period, or the properties of the linear polyester are adversely affected to a great extent. The third method is most advantageous, since flame retardants can be permanently incorporated into the final products without altering the properties of the linear polyesters excessively.

Thus, DOS (German Unexamined Laid-Open Application) No. 2,162,437 describes admixing bromine-containing aromatics and aryl phosphates with linear polyesters. A similar combination is described in DOS No. 2,139,395. In the latter disclosure, a mixture consisting of brominated diphenyls and triphenylphosphine oxide is used. A disadvantage of the foregoing combinations is that brominated aromatic compounds contained therein have a strong tendency to sublime at processing temperatures required for linear polyesters. Medical investigations found that the brominated compounds are difficult to degrade biologically and accumulate preferentially in liver tissue. This presents hazards which greatly restrict industrial use of these compounds.

It is an object of this invention to provide nonflammable molding compositions of linear polyesters which do not exhibit any of the above-described disadvantages.

SUMMARY OF THE INVENTION

This invention relates, in a thermoplastic, saturated linear polyester molding composition rendered nonflammable by the presence therein of (a) 0.1-2% by weight of phosphorus provided by an organic, oxygen-containing phosphorus compound; and (b) 0.5-10% by weight of bromine provided by a ring-brominated aromatic compound, the improvement wherein (b) is a compound of the formula

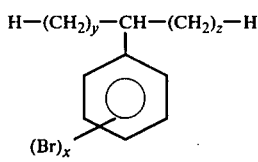

wherein x is an integer from 2 to 5, y and z each are zero or an integer from 1 to 17, and the sum of y + z is an integer between 7 and 17, or a mixture thereof.

DETAILED DESCRIPTION

Molding compositions of this invention contain nuclear-brominated, aromatic compounds of Formula A

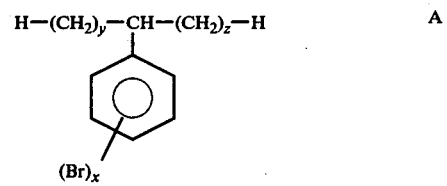

wherein x is an integer from 2 to 5, y and z each are zero or an integer from 1 to 17, and the sum of y + z is an integer between 7 and 17. Furthermore, y and z can also be of different magnitudes.

Compounds of Formula A are di-, tri-, tetra- and pentabromo-primary of sec.-alkyl-benzenes wherein alkyl is of 8-18 carbon atoms.

Preferred compounds are octyl-, nonyl-, decyl-, undecyl-, dodecyl-, tetradecyl-, and octadecylbenzenes of 3-5, most preferably 3-4 bromine on the benzene nucleus. Most preferred are nuclear-brominated alkyl benzenes having an alkyl of 8-14 carbon atoms. In place of the individual compounds, it is also possible to employ mixtures thereof. The nuclear-brominated aromatic compounds utilized in accordance with the invention generally have a bromine content between 30% and 70% and are used in amounts of 0.5-20%, preferably 1-10% by weight.

The nuclear-brominated, aromatic compounds of Formula A can be made by known methods as described in Journ. Am. Chem. Soc. 68, 424 (1946), Journ. Am. Chem. Soc. 76, 1106 (1954) or Ind. Eng. Chem., Prod. Res. Dev., Vol. 12, No. 3, 160 (1973).

The organic, oxygen-containing phosphorus compounds used in addition to the bromine-containing compounds are of triarylphosphino oxides of Formula B

and alkyl and aryl esters of arylphosphinic acids of Formula C

wherein $R_1$, $R_2$, and $R_3$ are aryl of up to 16 carbon atoms and R is $R_1$ or alkyl of up to 18 carbon atoms, e.g., phenyl, napthyl, diphenyl and methyl, ethyl and butyl, and wherein $R_1$, $R_2$, and $R_3$ can be identical or different.

Compounds of Formula B are utilized in amounts of 0.5-20%, preferably 1-10% by weight, of the entire molding composition.

Exemplary phosphorus compounds of Formula B and Formula C include, but are not limited to, triphenylphosphine oxide, trinaphthylphosphine oxide, tritolylphosphine oxide, tris(diphenyl)-phosphine oxide, phenylphosphonic acid diphenyl ester, phenylphosphonic acid dinaphthyl ester, phenylphosphonic acid ditolyl ester, and phenylphosphonic acid diethyl ester, phenylphosphonic acid di(dimethylnaphthyl)ester. Preferred phosphorus compounds are triphenylphosphine oxide, phenylphosphonic acid diphenyl ester, and phenylphosphonic acid diethyl ester.

Thermoplastic, saturated linear polyesters used in the compositions of the present invention are of the polyalkylene terephthalate type, wherein the alcohol component is an aliphatic or cycloaliphatic glycol of up to 8 carbon atoms, e.g., ethylene, propylene, butylene, pentylene, hexylene and octylene glycols and cyclohexanedimethanol. Ethylene glycol, 1,4-butanediol, or 1,4-bis(hydroxymethyl)cyclohexane are preferred. Up to 15 molar percent of the terephthalic acid can be replaced by another aromatic or aliphatic dicarboxylic acid, for example, isophthalic acid, naphthalenedicarboxylic acid, adipic acid, azelaic acid, sebacic acid, or dodecanedioic acid.

Methods for preparing the polyalkylene terephthalates are known from e.g. "Preparative Methods of Polymer Chemistry" (Interscience Publisher Inc., N.Y., 1961), p. 111-127, or Journ. Polym. Sci. A-1, 4, 1851-1859 (1966).

Molding compositions of this invention contain a quantity of flame-retardant agents such that the bromine content of the composition is 0.5-10% by weight, preferably 1-5% by weight, and phosphorus content is 0.1-2% by weight, preferably 0.3-1% by weight.

The most preferred compositions of this invention are those containing 1-5% by weight of bromine and 0.3-1% by weight of phosphorus; wherein (b) is an octyl-, nonyl-, undecyl-, dodecyl-, tetradecyl-, or octadecyl- tri-, tetra- or pentabromobenzene and the organic oxygen-containing phosphorus compound of a) is triphenylphosphine oxide, phenylphosphonic acid diphenyl ester, phenylphosphonic acid diethyl ester; and the polyester is a product of ethylene glycol, 1,4-butanediol, or 1,4-bis(hydroxymethyl)cyclohexane and terephthalic acid containing 1-15 molar percent of a second aromatic or aliphatic dicarboxylic acid.

The nonflammable molding compositions of this invention can also contain customary auxiliary agents and additives, for example, pigments, mold release agents, crystallization accelerators, and UV and heat stabilizers.

Such agents or additions are referred in Kunststoffhandbuch (C. Hanser Verlag, Munich, 1973), Vol. 8, p. 701-704.

Fillers, such as glass fibers, asbestos fibers, cotton fabric, paper, synthetic fibers, and metallic powder, can be incorporated up to 50% by weight of the total amount of composition.

The nonflammable molding compositions can be made by various conventional methods. For example, a mixture of brominated alkylbenzene and phosphorus compound can be added to the melt after the polycondensation reaction. It is likewise possible to incorporate the mixture in a finishing step conducted in a suitable extruder after polycondensation to the linear saturated polyester. The mixture can be added directly to the polyester melt in a processing extruder immediately prior to the processing operation (melt-spinning, extrusion) by suitable devices. It is also possible to prepare a concentrate of linear, saturated polyester, brominated alkylbenzene, and phosphorus compound and to mix this concentrate with polyester in a processing extruder.

The brominated alkylbenzenes used in this invention have excellent compatibility with thermoplastic, saturated linear polyesters and do not sublime or distill off at processing temperatures. The bromine content of the molding composition is practically unchanged after processing, so that harmful effects on the environment are avoided during manufacture and processing of the nonflammable molding compositions. In combination with the organic, oxygen-containing phosphorus compounds, brominatd alkyl-benzenes of Formula A impart to thermoplastic, saturated linear polyesters good flame-retardant properties, even in minor amounts.

Without further elaboration, it is believed that one skilled in the art can, using the preceding description, utilize the present invention to its fullest extent. The following preferred and comparative specific embodiments are, therefore, to be construed as merely illustrative, and not limitative of the remainder of the disclosure in any way whatsoever. In the following examples, all temperatures are set forth uncorrected in ° C.; unless otherwise indicated, all parts and percentages are by weight.

EXAMPLE 1

The quantities indicated in the table of brominated alkylbenzenes and organic phosphorus compounds indicated in the table are mixed in a drum with 10 kg. of granulated polyethylene terephthalate having a reduced solution viscosity of 0.67 dl./g. (measured at 25° C. as a 0.23% solution in a 60:40 phenol/tetrachloroethane mixture). Three kilograms of the mixture is homogenized in an extruder and processed into a molded panel. The remainder of the mixture is likewise homogenized in an extruder, extruded, and granulated.

The molded panel is cut into test rods according to ASTM D 2863-70 (150 × 6.5 × 3 mm.), the oxygen index of which was tested in accordance with ASTM D 2863-70. The granulated material is spun into threads in a conventional melt-spinning apparatus through a spinneret with 20 bores having a diameter of 0.25 mm. at a spinning temperature of 302° C. The threads are wound up at a take-off speed of 640 m./min. and are then stretched at a ratio of 1:3.9. The threads have the following characteristics:

Denier: 90/20 dtex (weight in g. of 10 km. of yarn)
Tear strength: 4.0 p./dtex
Elongation at rupture: 23%.

The threads were processed on a circular knitting machine into knit tubes from which fabric samples of 6 × 15 cm. are cut. The oxygen index of these fabric samples was determined in the same way as with the test rods, i.e., fabric samples were held vertically in the oxygen index tester in a U-shaped frame holder, and the fabric sample was ignited at the upper end. Individual values for oxygen index are compiled in the table. Additionally, the table sets forth bromine content of the respective mixtures prior to and after extrusion into the finished knit sample.

TABLE

| Experiment | Brominated Alkyl Benzene | Amount (g.) | Phosphorus Compound | Amount (g.) | Oxygen Index (% $O_2$) Rod (ASTM D 2863-70) | Oxygen Index (% $O_2$) Knit | Br Content (%) Prior to Extrusion | Br Content (%) Knit |
|---|---|---|---|---|---|---|---|---|
| 1 | (Tribromophenyl)-dodecane (mixture of isomers) | 300 | Triphenylphosphine oxide | 300 | 33.1 | 31.8 | 1.43 | 1.40 |
| d | (Tribromophenyl)-tetradecane (mixture of isomers) | 300 | Triphenyl phosphate | 300 | 32.6 | 32.0 | 1.43 | 1.38 |
| 2 | (Tetrabromophenyl)-undecane (mixture of isomers) | 600 | Triphenylphosphine oxide | 600 | 35.0 | 34.1 | 2.73 | 2.64 |
| 3 | 1:1:1 Mixture of the brominated alkyl benzenes of Experiments 1-3 | 300 | Triphenylphosphine oxide | 600 | 34.5 | 33.6 | 1.39 | 1.31 |
| e | (Tribromophenyl)-octane (mixture of isomers) | 400 | Phenylphosphonic acid diethyl ester | 400 | 34.9 | 33.9 | 1.87 | 1.75 |
| a | — | — | — | — | 25.0 | 22.1 | — | — |
| b | Hexabromobenzene | 300 | Triphenyl phosphate | 300 | 33.0 | 28.7 | 2.46 | 1.64 |
| c | Hexabromodiphenyl | 300 | Triphenylphosphine oxide | 300 | 31.4 | 29.0 | 2.16 | 1.79 |

EXAMPLE 2

Five kilograms of polybutylene terephthalate granules having a reduced solution viscosity of 1.2 dl./g. (measured at 25° C. as a 0.23% solution in a 60:40 phenol/tetrachloroethane mixture) is mixed in a drum with 200 g. of (tribromophenyl)undecane (mixture of isomers) and 200 g. of triphenylphosphine oxide. The mixture is homogenized in an extruder and processed into an extruded panel which is cut into test rods (150 × 6.5 × 3 mm.). The oxygen index of these test rods, determined in accordance with ASTM D 2863-70, is 30.4% $O_2$ as compared to 20.2% $O_2$ for polybutylene terephthalate which has not been rendered nonflammable.

COMPARATIVE EXAMPLE 3

Example 2 is repeated, but using 200 g. of triphenyl phosphate in place of triphenylphosphine oxide. The oxygen index of the mixture, determined according to ASTM D 2863-70, is 29.8% $O_2$.

The examples denoted by letters are control samples.

The preceding examples can be repeated with similar success by substituting the generically or specifically described reactans and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a thermoplastic, saturated linear polyester molding composition rendered nonflammable by the presence therein of
    (a) 0.1-2% by weight of phosphorus provided by an organic, oxygen-containing phosphorus compound; and
    (b) 1-5% by weight of bromine provided by a ring-brominated aromatic compound,
    the improvement wherein the phosphorus compound of (a) is triphenylphosphine oxide and the bromine compound of (b) is a compound of the formula

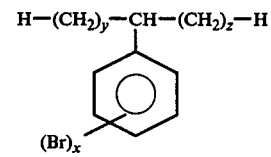

wherein x is an integer from 2 to 5, y and z each are 0 or an integer from 1 to 17, and the sum of y + z is an integer between 7 and 17, or a mixture thereof.

2. The composition of claim 1, wherein (b) is an octyl-, nonyl-, undecyl-, dodecyl-, tetradecyl-, or octadecyl-tri-tetra- or pentabromobenzene.

3. The composition of claim 1, containing 1-5% by weight of bromine and 0.3-1% by weight of phosphorus.

4. The composition of claim 1, wherein the polyester is a product of ethylene glycol, 1,4-butanediol, or 1,4-bis(hydroxymethyl)cyclohexane and terephthalic acid containing 0-15 molar percent of a second aromatic or aliphatic dicarboxylic acid.

5. The composition of claim 1, containing 1-5% by weight of bromine and 0.3-1% by weight of phosphorus, wherein (b) is an octyl-, nonyl-, undecyl-, dodecyl-, tetra- decyl-, or octadecyl-tri-, tetra-or pentabromobenzene and the polyester is a product of ethylene glycol, 1,4-butanediol, or 1,4-bis-(hydroxymethyl)cyclohexane and terephthalic acid containing 0-15 molar percent of a second aromatic or aliphatic dicarboxylic acid.

6. The composition of claim 1, wherein the ring-brominated aromatic compound is a mixture of (tribromophenyl)dodecane isomers.

7. The composition of claim 1, wherein the ring-brominated aromatic compound is a mixture of (tribromophenyl)tetradecane isomers.

8. The composition of claim 1, wherein the ring-brominated aromatic compound is a mixture of (tetrabromophenyl)undecane isomers.

9. The composition of claim 1, wherein the ring-brominated aromatic compound is a mixture of (tribromophenyl)dodecane, (tribromophenyl)tetradecane and (tetrabromophenyl)undecane isomers.

10. The composition of claim 1, wherein the ring-brominated aromatic compound is a mixture of (tribromophenyl)octane isomers.

* * * * *